United States Patent

[11] 3,623,760

| [72] | Inventor | Richard E. Beswick |
| | | Box 294 Mae Ave., Pemberton, N.J. 08068 |
| [21] | Appl. No. | 14,409 |
| [22] | Filed | Feb. 26, 1970 |
| [45] | Patented | Nov. 30, 1971 |

[54] AUTOMOTIVE SAFETY DEVICE
7 Claims, 6 Drawing Figs.

[52] U.S. Cl. .................................................. 293/86,
293/85, 267/121, 267/34, 213/223
[51] Int. Cl. .................................................. B60r 19/08
[50] Field of Search .................................................. 293/51 F,
85, 86; 267/34, 121, 151; 213/223; 104/256

[56] References Cited
UNITED STATES PATENTS

| 365,939 | 7/1887 | Post | 239/337 |
| 2,260,634 | 10/1941 | Mullner | 267/34 |
| 1,118,818 | 11/1914 | Sherman | 267/34 X |
| 1,530,017 | 3/1925 | Souliotis | 293/55 |
| 2,600,060 | 6/1952 | Lopes et al. | 293/85 |
| 3,226,146 | 12/1965 | Behr | 293/30 |

Primary Examiner—Arthur L. La Point
Assistant Examiner—Robert Saifer
Attorney—Robert K. Youtie ABSTRACT: A shock-absorbing construction for vehicles including the combination of both fluid shock-absorbing means and resilient mechanical shock-absorbing means.

PATENTED NOV 30 1971　　　　　　　　　　　　3,623,760

INVENTOR.
RICHARD E. BESWICK
BY
Robert K. Youtie
ATTORNEY.

AUTOMOTIVE SAFETY DEVICE

SUMMARY OF THE INVENTION

It is a general object of the present invention to provide a highly improved shock absorber construction, which is capable of absorbing considerably greater shock so as to substantially reduce the possibility of damage in collision.

It is a further object of the present invention to provide a shock absorber having the advantageous characteristics mentioned in the preceding paragraph, which is extremely simple in construction and operation, durable and reliable throughout a long useful life, and which can be economically manufactured for installation in new and existing vehicles at a reasonable price.

It is a more particular object of the present invention to provide a shock absorber structure having a unique cooperating relationship between mechanically resilient and hydraulic means, and wherein the structure is well adapted for use in a wide variety of sizes and types of vehicles.

While the shock absorber of the present invention has been illustrated and described hereinafter with particular reference to an automotive vehicle, it is understood that the device is capable of many varied applications, all of which are intended to be comprehended herein.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
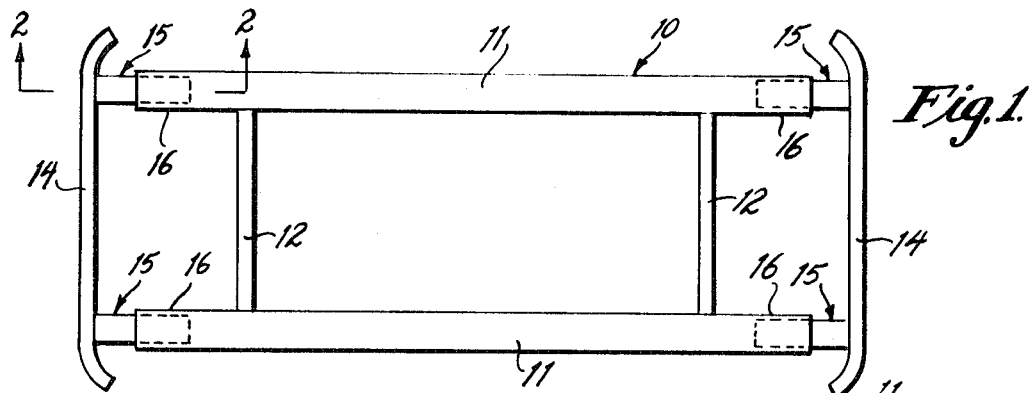
FIG. 1 is a top plan view showing a shock absorber device of the instant invention in association with an automotive vehicle frame, the shock absorber being in a normal, relaxed condition.

Referring now more particularly to the drawings, and specifically to FIG. 1, a frame is there generally designated 10, which may be that of an automotive vehicle, and is shown for purposes of illustration as including a pair of laterally spaced, longitudinally extending side members 11, and a pair of spaced, transverse frame members or struts 12 each extending laterally between the side frame members. The frame 10 may be generally conventional, and the side members 11 may be of tubular, open-ended construction, conventionally being of rectangular cross-sectional configuration.

A laterally extending bumper 14 is shown beyond each end of the frame 10, and a pair of shock absorber structures 15 are carried by each bumper 14 at spaced locations therealong and respectively engaged in the adjacent open end region 16 of a frame side member 11. As each shock absorber device 15 may be identical, a detailed description of one will suffice.

Figure 2:
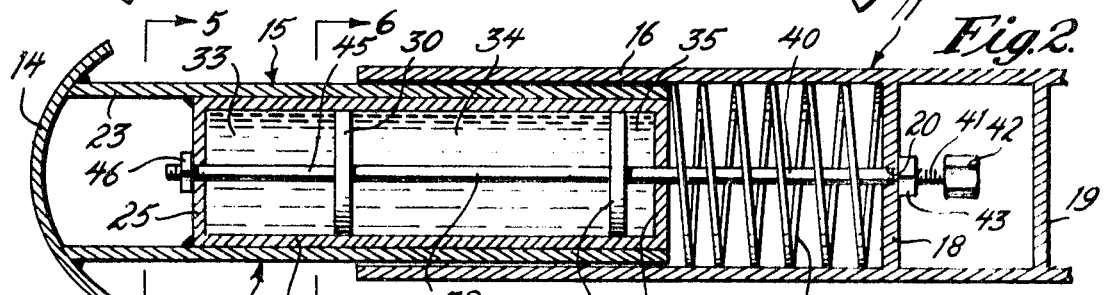
FIG. 2 is a partial sectional view taken substantially along the line 2—2 of FIG. 1.

In FIG. 2 is shown in greater detail one end region 16 of a frame side member 11, wherein a pair of abutment members or plates 18 and 19 are fixedly secured internally of the side member adjacent to and spaced from the free end thereof. In particular, the abutments or plates 18 and 19 may be of generally rectangular configuration to extend conformably across the interior of the frame side member 11, the abutments being spaced apart longitudinally of the side member, with the abutment 18 closer to the open end of the side member. Centrally of the abutment 18 may be provided a through hole 20, for a purpose appearing presently.

The shock absorber device includes a shock-receiving assembly 22 which consists of a generally tubular sleeve 23 slidably engaged in the open end region 16 of frame member 11. The sleeve 23 may be of elongate, tubular configuration, generally rectangular in cross section for conforming slidable engagement in the frame end region 16, and projects outward therebeyond for fixed securement to the bumper 14. Interiorly of the sleeve 23, the shock-receiving assembly is provided with a cylinder 24 fixed in the sleeve, as by welding or otherwise, and having its opposite ends closed, as at 25 and 26.

Figure 3:
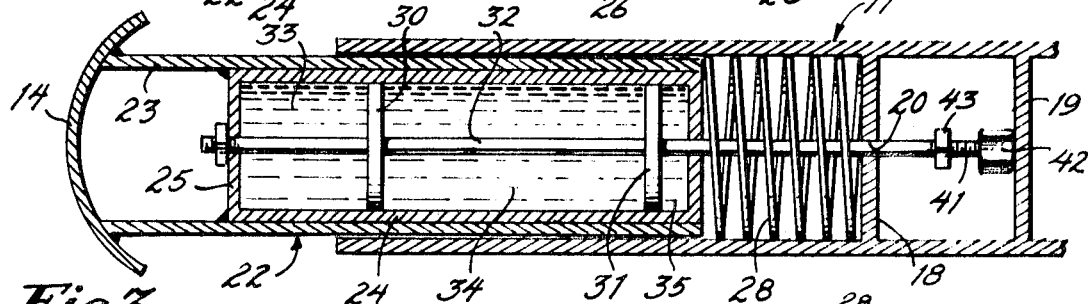
FIG. 3 is a sectional view similar to FIG. 2, but showing the shock absorber in an intermediate condition of operation.
Figure 4:
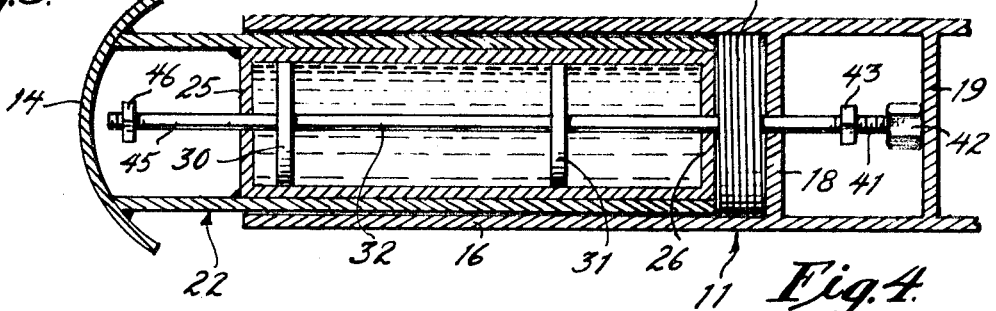
FIG. 4 is a sectional view similar to FIGS. 2 and 3, but showing the shock absorber in its full absorbing condition.
Figure 5:
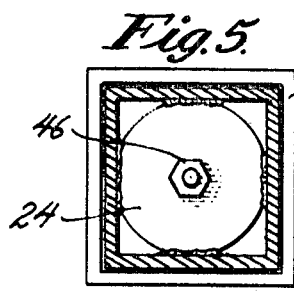
FIG. 5 is a sectional view taken substantially along the line 5—5 of FIG. 2.

Located interiorly of the frame member 11, interposed between the outer abutment 18 and inner end of the assembly 22 is a coil compression spring 28. The spring 28 provides resilient means yieldably urging the shock-receiving assembly 22 and bumper 14 outward or leftward, as seen in FIGS. 2-4.

Figure 6:
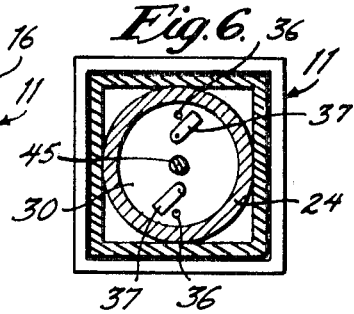
FIG. 6 is a sectional view taken substantially along the line 6—6 of FIG. 2.

Interiorly of the cylinder 24 are a pair of spaced pistons 30 and 31 rigidly connected together by a shaft 32. The pistons 30 and 31 are therefore slidable as a unit in the cylinder 24 and serve to subdivide the latter into outer, intermediate and inner chambers 33, 34 and 35, respectively. The entire cylinder 24 is filled with hydraulic fluid or liquid; and, each of the cylinders is provided with a pair of through orifices, as shown at 36 in FIG. 6 to pass fluid upon sliding movement of the pistons relative to the cylinder 24. Suitable adjustable valve or closure means, such as pivoted fingers 37 are mounted on the pistons 30 and 31, each adjacent to a respective orifice and swingable to regulate the orifice opening. The orifices 36 and valve elements 37 combine to meter fluid flow through the pistons 30 and 31 upon piston movement relative to the shock-receiving assembly 22, and other suitable fluid-flow metering means may be employed, if desired.

A piston rod 40 extends from the inner piston 31 slidably through and beyond the inner cylinder wall 26 and thence through the opening 20 of abutment 18. The inner or distal end of piston rod 40 may be threaded, as at 41, and thereby provided with a pair of inner and outer adjustable stops or nuts 42 and 43. As will appear presently, the inner stop 42 is engageable with the inner abutment 19, and the outer stop 43 engageable with the outer abutment 18. Of course, other suitable adjustable-stop means may be employed, if desired.

An additional piston rod 45 may extend outward from the outer piston 30 slidably through the outer cylinder end wall 25, and there externally threaded or otherwise suitably provided for carrying an adjustable stop or nut 46.

In the normal condition of FIG. 2, it is apparent that the resilient means or spring 28 is urging the shock-receiving assembly 22 outward to a limiting position determined by engagement of the stop 43 with the outer abutment 18. Under relatively low shock imparted to the bumper 14, the shock-receiving assembly 22 is slid inward into the frame member 11 against the resilient force of spring 28. The spring 28 absorbs all of the initial shock imparted to the bumper 14 until the condition of FIG. 3 obtains, wherein the stop 42 is moved inward into limiting engagement with the abutment 19. The spring 28 is configured and proportioned so as to be compressed approximately one-third of its total permissible compression in the intermediate condition of FIG. 3; and, up to this point the piston means 30, 31 has moved inward together with the shock-receiving assembly 22, the orifice openings 36 being sufficiently small to substantially prevent piston movement relative to the cylinder 24.

It will be noted that the pistons 30 and 31 are disposed inward or proximate to the inner end 26 of the cylinder 24, the precise position being determined by adjustment of stop 46.

Upon continued shock imparted to the bumper 14 in the condition of FIG. 3, the resilient means 28 is further compressed, and the pistons 30, 31 displaced outward relative to the assembly 22, to the final condition shown in FIG. 4. Thus, between the conditions of FIGS. 3 and 4 shock is absorbed both by the final two-thirds of spring compression together with the dashpot effect of hydraulic fluid passing through the orifices 36 upon outward piston movement relative to the cylinder 24.

It may be observed that, in movement of the assembly 22 between the conditions of FIGS. 3 and 4, the cylinder chambers 33, 34 and 35 are of progressingly decreasing pressure. Stated conversely, the cylinder chambers 35, 34 and 36 in the direction of piston movement relative to the cylinder are of successively greater pressure. The instant structure thereby permits of reduced pressure differential on the pistons for increased wear and savings in cost.

Also, in recoil or expansion of spring 28 from the compressed condition of FIG. 4, dangerously abrupt recoil action is effectively prevented by the dashpot action of the pistons 30, 31 in the fluid-occupied chambers 33, 34 and 35; and, the chambers will assume successively greater pressures in the opposite or inward direction, which is the direction of piston movement relative to the assembly.

From the foregoing, it is seen that the present invention provides a shock-absorbing structure which fully accomplishes its intended objects and is well adapted to meet practical conditions of manufacture, installation and use.

Although the present invention has been described in some detail by way of illustration and example for purposes of clarity of understanding, it is understood that certain changes and modifications may be made within the spirit of the invention.

What is claimed is:

1. The combination with a vehicle having a tubular frame member open at one end of a shock absorber comprising abutment means in said frame member spaced from said one end thereof, a hollow shock-receiver assembly arranged longitudinally in said frame member projecting beyond said one end thereof and slidable in said frame member between extended and retracted positions, resilient means interposed is said frame member for yieldably urging said assembly toward its extended position, fluid sealed in the hollow of said assembly, piston means in said assembly and movable in opposite directions longitudinally relative thereto, said piston means having orifice means for passing said fluid during piston movement relative to said assembly, piston-rod means extending from said piston means slidably through and beyond said assembly for limited engagement with said abutment means in opposite directions of piston-means movement, said piston and rod means being movable with said assembly upon initial retraction thereof against the force of said resilient means into one position of said limiting engagement, said resilient means being configured for partial compression upon retraction of said assembly to said one position of limiting engagement, continued retraction of said assembly further compressing said resilient means and moving said piston means relative to said assembly in one direction, recoil of said resilient means effecting initial projection of said assembly to the other position of said limiting engagement and subsequent piston-means movement relative to said assembly in the opposite direction, and adjustment means on said piston-rod means for selectively locating said piston means and assembly in said positions of limiting engagement.

2. The combination with a vehicle having a tubular frame member open at one end of a shock absorber comprising abutment means in said frame member spaced from said one end thereof, a hollow shock-receiver assembly arranged longitudinally in said frame member projecting beyond said one end thereof and slidable in said frame member between extended and retracted positions, resilient means interposed in said frame member for yieldably urging said assembly toward its extended position, fluid sealed in the hollow of said assembly, piston means in said assembly and movable in opposite directions longitudinally relative thereto, said piston means having orifice means for passing said fluid during piston movement relative to said assembly, and piston-rod means extending from said piston means slidably through and beyond said assembly for limiting engagement with said abutment means in opposite directions of piston-means movement, said piston and rod means being movable with said assembly upon initial retraction thereof against the force of said resilient means into one position of said limiting engagement, said resilient means being configured for partial compression upon retraction of said assembly to said one position of limiting engagement, continued retraction of said assembly further compressing said resilient means and moving said piston means relative to said assembly in one direction, recoil of said resilient means effecting initial projection of said assembly to the other position of said limiting engagement and subsequent piston-means movement relative to said assembly in the opposite direction, the movement of said piston-rod means between said positions of limiting engagement constituting approximately one-third the stroke of assembly movement, the balance of assembly movement being relative to said piston means.

3. The combination with a vehicle having tubular frame member open at one end of a shock absorber comprising abutment means in said frame member spaced from said one end thereof, a hollow shock-receiver assembly arranged longitudinally in said frame member projecting beyond said one end thereof and slidable in said frame member between extended and retracted positions, resilient means interposed in said frame member for yieldably urging said assembly toward its extended position, fluid sealed in the hollow of said assembly, piston means in said assembly and movable in opposite directions longitudinally relative thereto, said piston means having orifice means for passing said fluid during piston movement relative to said assembly, piston-rod means extending from said piston means slidably through and beyond said assembly for limiting engagement with said abutment means in opposite directions of piston-means movement, said piston and rod means being movable with said assembly upon initial retraction thereof against the force of said resilient means into one position of said limiting engagement, said resilient means being configured for partial compression upon retraction of said assembly to said one position of limiting engagement, continued retraction of said assembly further compressing said resilient means and moving said piston means relative to said assembly in one direction, recoil of said resilient means effecting initial projection of said assembly to the other position of said limiting engagement and subsequent piston-means movement relative to said assembly in the opposite direction, and additional piston-rod means connected to said piston means and engageable with said assembly to limit extension of said assembly under the force of said resilient means.

4. The combination with a vehicle having a tubular frame member open at one end of a shock absorber comprising abutment means in said frame member spaced from said one end thereof, a hollow shock-receiver assembly arranged longitudinally in said frame member projecting beyond said one end thereof and slidable in said frame member between extended and retracted position, resilient means interposed in said frame member for yieldably urging said assembly toward its extended position, fluid sealed in the hollow of said assembly, piston means in said assembly and movable in opposite directions longitudinally relative thereto, said piston means having orifice means for passing said fluid during piston movement relative to said assembly, and piston-rod means extending from said piston means slidably through and beyond said assembly for limiting engagement with said abutment means in opposite directions of piston-means movement, said piston and rod means being movable with said assembly upon initial retraction thereof against the force of said resilient means into one position of said limiting engagement, said resilient means being configured for partial compression upon retraction of said assembly to said one position of limiting engagement, continued retraction of said assembly further compressing said resilient means and moving said piston means relative to said assembly in one direction, recoil of said resilient means effecting initial projection of said assembly to the other position of said limiting engagement and subsequent piston-means movement relative to said assembly in the opposite direction, said abutment means comprising a pair of abutment members at longitudinally spaced locations in said frame member, said piston-rod means including a pair of stops respectively engageable with said abutment members to define said positions of limiting engagement.

5. The combination with a vehicle having a tubular frame member open at one end of a shock absorber comprising abutment means in said frame member spaced from said one frame end, a hollow shock-receiver assembly arranged longitudinally in said frame member projecting beyond said one end thereof and slidable in said frame member between extended and retracted positions, resilient means interposed in said frame member for yieldably urging said assembly toward its extended position, fluid sealed in the hollow of said assembly, a pair of spaced pistons in said assembly and movable in opposite directions longitudinally relative thereto, a piston rod rigidly connecting said pistons in their spaced relation and extending slidably through and beyond said assembly for limiting engagement with said abutment means in opposite directions of piston movement, said pistons each having an orifice for passing said fluid during piston movement relative to said assembly, said pistons combining with said assembly to define therein a plurality of fluid-occupied chambers of successively increasing pressure in the direction of piston movement relative to said assembly, said pistons and rod being movable with said assembly upon initial retraction thereof against the force of said resilient means into one position of said limiting engagement, said resilient means being configured for approximately one-third compression upon retraction of said assembly to said one position of limiting engagement, continued retraction of said assembly further compressing said resilient means and moving said pistons relative to said assembly in one direction, said resilient means effecting initial projection of said assembly to the other position of said limiting engagement and subsequent piston movement relative to said assembly in the opposite direction.

6. The combination according to claim 5, in combination with adjustable stop means on said piston rod and engageable with said abutment means for selectively locating said pistons and assembly in said positions of limiting engagement, and an additional piston rod connected to said pistons and engageable with said assembly to limit extension of said assembly under the force of said resilient means.

7. The combination according to claim 5, said abutment means comprising a pair of abutment members spaced longitudinally of said frame member and respectively engageable with said piston rod upon said conditions of limiting engagement.

* * * * *